April 9, 1968
C. G. PITKIN ET AL
3,376,753
PARTICULATE FLOW METER APPARATUS
Filed Nov. 26, 1963
2 Sheets-Sheet 1
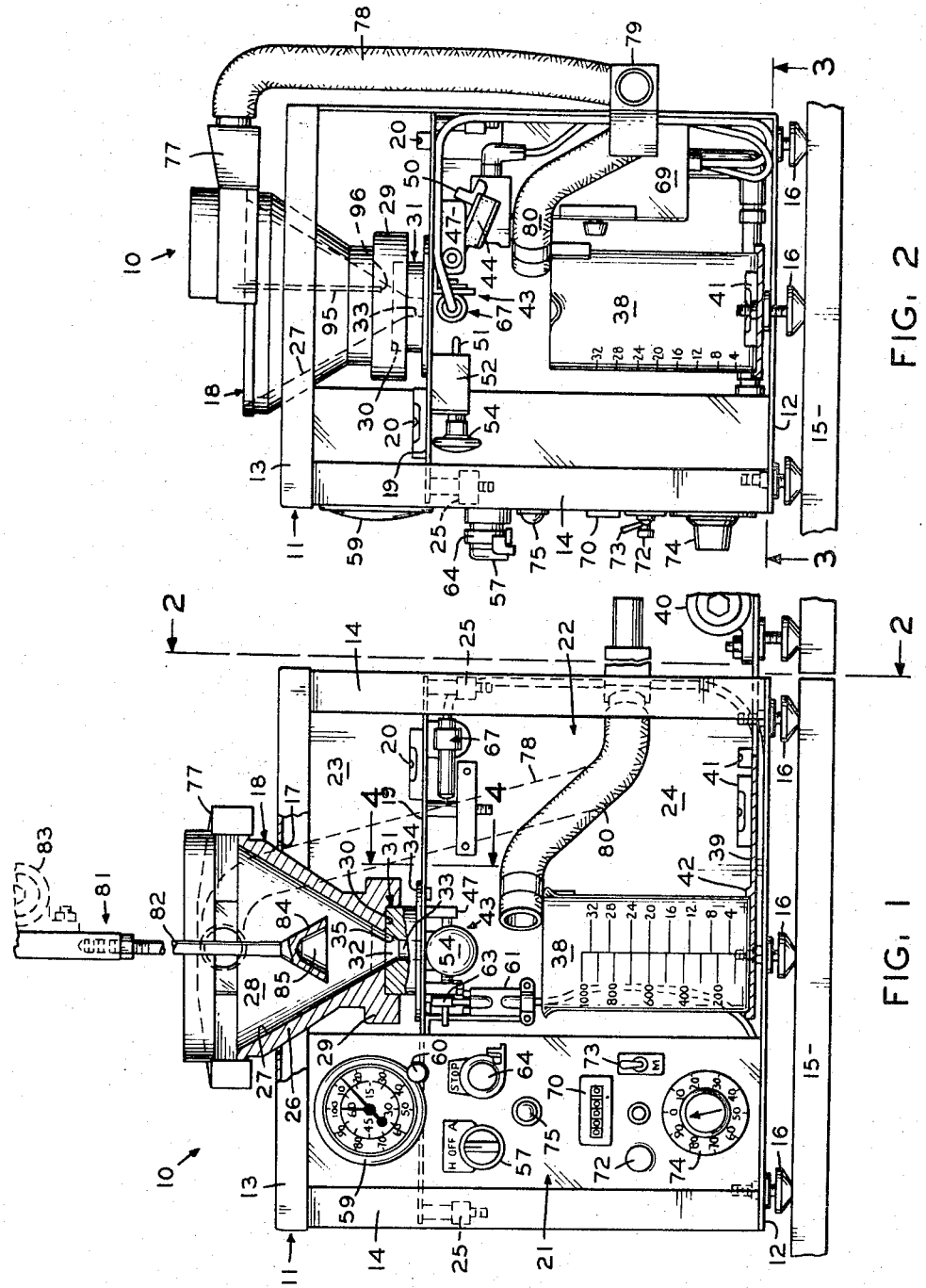
INVENTORS
COURTNEY G. PITKIN
ARUN K. MITRA
BY
*Gravely, Lieder & Woodruff*
ATTORNEYS April 9, 1968
C. G. PITKIN ET AL
3,376,753
PARTICULATE FLOW METER APPARATUS
Filed Nov. 26, 1963
2 Sheets-Sheet 2
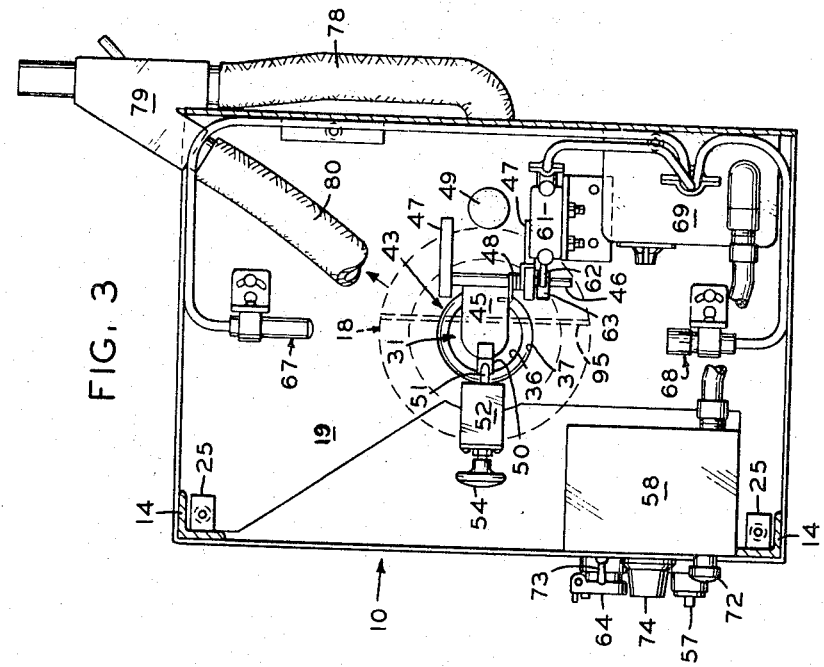
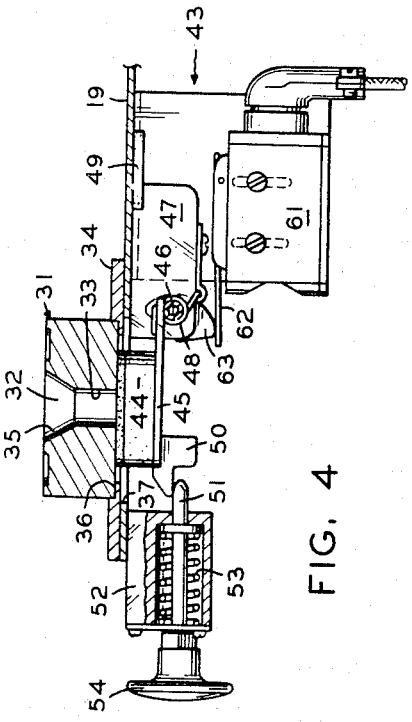
INVENTORS
COURTNEY G. PITKIN
ARUN K. MITRA
BY
*Gravely, Lieder &
Woodruff*
ATTORNEYS

United States Patent Office 3,376,753
Patented Apr. 9, 1968

3,376,753
PARTICULATE FLOW METER APPARATUS
Courtney G. Pitkin and Arun K. Mitra, University City, Mo., assignors to Lewis-Howe Company, St. Louis, Mo., a corporation of Delaware
Filed Nov. 26, 1963, Ser. No. 325,952
7 Claims. (Cl. 73—432)

ABSTRACT OF THE DISCLOSURE

An apparatus for measuring the flowability of particulate materials from a hopper through a preselected orifice device, the hopper and orifice device having contiguous side walls, and the apparatus including a closure normally preventing material flow through the orifice and being actuated to a remote position to permit material flow and to condition a signaling device for operation only in response to the actual flow of material through the orifice device, and a recording device controlled by the signaling device.

This invention relates generally to laboratory test apparatus and more particularly to instrumentation for the study of the rheology of particulate materials.

Particulate materials of widely differing types, kinds and forms are used throughout the industry in the manufacture of various industrial, commercial and consumer products and in accordance with different processes or manufacturing techniques. Representative of various industry uses of particulate materials are such fields as chemicals, plastics, metals, food products, cleansers (including detergents), and pharmaceuticals. The various industries have encountered different, but related, problems pertaining to the flowability of particulate materials, most of these problems involving the handling of the material such as in the formation (comminution), transportation, treatment, preparation or other processing. It is generally recognized that the various handling problems pertaining to flowability of matter is an important, if not critical, factor in efficient production. In the past, various rheological studies of particulate materials have been made, but this subject is not believed to have received the attention it deserves as an important factor in production.

For the purpose of disclosing the present invention and not by way of limitation, the rheology of pharmaceutical granulations and powders will be considered in order to more fully understand the flow problems and properties of such materials. A representative list of some of the more important factors that influence the flow properties of particulate matters may include particle shape, particle size, amount and type of lubricants and glidants, variation in the length and shape of feeding ducts, conduits, orifices or the like, amount of material, the effect of pressure regulating device including agitators or vibrators, particle size distribution, surface characteristics such as roughness and cohesiveness, intra-particular forces of attraction and repulsion, angular forces such as angle of repose, angle of internal friction and angle of wall friction, relationship of particle size to the size of the duct, conduit or orifice, and amount of moisture.

In the manufacture of pharmaceutical products, uniformity of dosage is one of the most critical production problems, particularly in forming tablets or filling capsules where the dosage is determined by volumetric measurement. In other words, the uniformity of dosage is dependent primarily on the ability of the manufacturer to make the formula flow evenly into a volumetric device. Modern manufacturing techniques and equipment are designed toward extremely high speed production to reduce costs with the result that relatively free and uniform material flow is more important today than in the past. In the production of some pharmaceutical products on high speed equipment, means for "forced feeding" have been employed to obviate some material flow problems, but gravity feed of granulation or powder is still widely employed in production equipment. In short, the basic reasoning behind all granulating methods and equipment is to produce, not only a uniform formulation but, a granulation that is capable of free and uniform flow for accurate volumetric measurement into relatively small dies or through relatively small orifice means for uniform dosage of the resulting product. In the pharmaceutical industry, as in other fields, specific formulations of ingredients permit relatively little or no flexibility in the type or form of active ingredients being processed or handled, and the only variables in these formulations are the inert excipients, such as lubricants, glidants, flavoring and the like. Accordingly, deviations in flowability of such formulations depend almost entirely upon the specific excipient materials employed or the amount of moisture used in the granulation. It will be understood, of course, that quality control of formulation plays an important factor in uniformity of the granulation and deviations in the rate of flowability of materials may occur due to lack of proper quality control.

The principal object of the present invention is to provide flow meter apparatus for measuring the relative flowablity of various materials.

Another object is to provide test apparatus for minimizing obstruction to material flow in production by determining optimum material flow conditions and formulation.

Another object is to provide laboratory apparatus for the evaluation or testing of the flowability of materials to assist in quality control of preparation or formulation thereof and maintain production equipment operative.

Another object is to provide laboratory apparatus for evaluating glidants and other materials to enhance free flow and for pre-testing formulations without employing production equipment therefor.

Another object of the invention is to provide flow meter apparatus for empirical or docimastic determination of comparative rate of flow values for various granulated materials thereby establishing a basis for comparative evaluation of subsequent granulated material properties and the flowability and quality control thereof.

A still further object of the present invention is to provide a flow meter apparatus for the rheological study of particulate materials and, particularly, the comparative analysis of established formulations or properties of particulate or powder material with preset standards therefor.

Another object of the invention is to provide laboratory apparatus adapted for substantially continuous use with a minimum of cleaning and servicing. The present apparatus is simple and capable of use in testing flowability of most particulate materials.

These and still other objects and advantages of the present invention will become readily apparent hereinafter.

The invention is embodied in an apparatus for measurement of the flowability of particulate materials comprising means containing a predetermined amount of particulate material, gauging means having predetermined standards of material flow rate established therefor and positioned below said first mentioned means, means normally closing said gauging means and adapted to establish particulate material flow therethrough, and other means responsive to particulate material flow for effecting measurement of the rate thereof.

The invention is also embodied in the parts and in the combinations and arrangements of parts hereinafter described and claimed. In the accompanying drawings forming a part of the present specification and in which like numerals refer to like parts wherever they occur;

FIGURE 1 is a front elevational view, partly broken away, showing a flow meter apparatus embodying the invention, FIGURE 2 is an elevational view of the flow meter apparatus taken along line 2—2 of FIGURE 1, but showing a modified hopper device, FIGURE 3 is a cross-sectional view of the flow meter apparatus taken substantially along line 3—3 of FIGURE 2, FIGURE 4 is a greatly enlarged fragmentary sectional view taken along line 4—4 of FIGURE 1, FIGURE 5 is a diagrammatic view of a particulate hopper device for the apparatus, FIGURE 6 is a view similar to FIGURE 5 showing a preferred form of a particulate hopper device, FIGURE 7 is another view similar to FIGURE 5 showing another form of a particulate hopper device, and FIGURES 8–13 are a series of greatly enlarged sectional views showing a set of exchangeable particulate metering means for the apparatus.

Referring now to the drawings, a flow meter apparatus 10 according to the present invention includes a main frame assembly 11 having a bottom frame portion 12 and a top frame portion 13 interconnected and spaced apart by vertical frame sections 14. The main frame assembly 11 is supported on a suitable base or pedestal 15 by adjustable leveling legs 16. The top frame portion 13 includes an opening 17 or suitable positioning means receiving and supporting a particulate material reservoir or hopper 18 accommodating a supply of particulate material to be measured by the apparatus 10. A horizontal divider or partition 19 is positioned between the bottom and top frame portions 12 and 13 and is illustrated as being adjustably mounted on the vertical frame sections 14 by threaded mounting means 25. The partition 19 extends substantially parallel with the top and bottom frame portions and may form an adjustable shelf and hopper support carrying levels 20, as will be described more fully.

As shown in FIGURE 1, the main frame assembly is divided into a leftward main control section 21 and a rightward material metering and measuring section 22, the latter being sub-divided by the horizontal partition 19 into an upper reservoir and metering partion 23 and a lower measuring and receiving portion 24.

The hopper 18 comprises a funnel-shaped device having an imperforate tapering wall 26 having an inner surface 27 defining a frusto-conical or funnel-shaped opening 28, the side wall surface 27 being machined to be substantially obstruction free to obviate the impedance of particulate material flow from the hopper 18. The hopper 18 also has an enlarged base portion 29 having a recess 30 in the bottom surface thereof, which recess is centered with respect to the bottom outlet end of the opening 28. It will be noted that the hopper side wall and base portions 26 and 29 are received through the opening 17 or other suitable mounting arrangement in the top wall 13 of the main frame assembly 11 with the base portion 29 being in juxtaposition with the horizontal partition 19. A particulate metering device, such as a die 31, fits within the recess 30 of the hopper 18 and includes a frusto-conical upper opening 32 defined by a side wall surface 35 forming an uninterrupted continuation of the side wall surface 27 of the hopper, the opening 32 being in communication with a vertical cylindrical opening 33 simulating a die cavity or other particulate metering opening or orifice, as will be defined more fully hereinafter. The die 31 is supported on a die indexing plate 34 carried by the horizontal partition 19, and the vertical die cavity 33 extends through the die 31 and opens into the lower particulate measuring and receiving portion 24 of the material measuring section of the apparatus 10 through suitable openings 36 and 37 in the indexing plate 34 and partition 19.

A vertical particulate flow area or path is provided in the particulate measuring and receiving portion 24 for the free fall of material from the hopper 18 through the die cavity 33 into a suitable receiving container 38 (shown as a graduated beaker in FIGURES 1 and 2). The receiving container or receiver 38 is positioned on a receptacle holder or plate 39 comprising a cantilever extension from a vibratory device 40 mounted on the base 15 externally of the main frame assembly 11. The cantilever plate 39 is provided with suitable leveling devices 41 and the plate 39 includes an annular rim 42 for preventing displacement of the receiver 38 from the plate due to vibration.

A flow control device 43 is provided below the horizontal partition 19 for normally closing the lower outlet end of the die cavity 33 thereby normally containing particulate material within the hopper 18 and die cavity. Acutation of the flow control device conditions the entire flow meter apparatus 10 for measurement of particulate flow. Referring particularly to FIGURE 4, it will be seen that the flow control devices 43 includes trap-door means having a yieldable hopper valve element 44 carried on one end of a plate 45 having its other end journaled on a pin 46 secured on supports 47 attached in spaced relation to the lower surface of the partition 19. The plate 45 is adapted for pivotal or hinging movement on the pin 46 between an inoperative position in which the hopper valve element 44 closes the outlet end of a die cavity 33 (as shown in FIGURE 4) and a released or actuated position (as indicated in FIGURE 2) in which the hopper valve is swung away from the die cavity opening 33 to permit the flow of particulate material therethrough. Spring means 48 are provided between the plate 45 and one of the rigid supports 47 biasing the hopper valve element and plate toward the released or actuated position thereof. A resilient stop element 49 is secured to the undersurface of the partition 19 to be engaged by the trap-door device in its remote position and provide a cushion therefor. A catch member 50 is secured on the outer free end of the plate 45, the catch member being normally engaged by a latch element 51 slidable in a frame support 52 and biased toward projected position (FIGURE 4) by spring means 53. A manual flow actuator knob 54 is provided for moving the latch element 51 to a retracted position against the biasing action of the spring 53 for releasing the catch member 50 thereby activating the flow control device to move the hopper valve element 44 to its remote position.

The flow meter apparatus is adapted for either manual (hand) or automatic operation and includes a selector switch 57 on the main control panel 58 of the control panel section 21 of the main frame assembly. An electric timer 59 of conventional construction is provided on the control panel 58 and is actuated for measurement of particulate material flow rate in both the manual and automatic operation of the apparatus 10, as will appear. The timer reset is shown at 60. The electric timer circuit, for both manual and automatic operation, includes a micro-switch 61 (FIGURES 3 and 4) mounted below the partition 19 and having a forwardly extending switch element 62. The flow control device 43 includes an eccentric or cam 63 secured to the plate 45 or its journal for rotation therewith between inoperative and actuated positions. The cam 63 engages the switch element 62 in the inoperative position of the flow control device thereby holding the micro-switch 61 in open condition throughout movement of the hopper valve 44 to its actuated position and, when in the retracted position, the cam 63 releases the switch element 62 to close the micro-switch 61 in the circuit for the electric timer 59. Thus, the cam 63 is adapted to delay operation of the timer circuit until the trap door is opened so that material flow should occur.

In the manual operation of the apparatus 10, the selector switch 57 is moved to its manual position H and the actuator knob 54 is pulled to release the flow control device 43 thereby uncovering the die cavity 33 and moving the cam 63 from the micro-switch element 62 to complete the circuit to the electric timer 59. Flow of particulate material is observed visually by the operator and when the last particles of material fall through the die cavity, or at any other time the operator wishes to stop the operation, a manual timer operating switch 64 is actuated to terminate the measurement of particulate flow. A rectifier is provided in the clock motor circuit to eliminate timer coasting. The circuitry to the electric timer for manual operation includes the micro-switch 61, which is also common to the automatic circuit and other automatic circuit components are by-passed by the selector switch 57.

In the automatic operation of the apparatus 10, measurement of the flowability of particulate material is accomplished by photo-electric signaling device or sensing means including a photo-electric cell or light transmitting member 67 and a light beam receiver or eye 68. As shown in FIGURES 1 and 3, the photo-electric elements 67 and 68 are secured to the lower surface of the partition 19 in aligned, opposed relationship on opposite sides of the vertical particulate flow path immediately below the partition 19. The light transmitter 67 and beam receiver 68 are wired to a control box 69 secured to the main frame assembly 11. The photo-electric means includes an adjustable sensitizing control for increasing the sensitivity of the beam receiver 68 to operate with a smaller signal from the transmitter 67. The size of beam is extremely small since it must be smaller than the finest stream of particulate material being measured. The sensitivity control means also permits adjustments in sensitivity to provide for environmental conditions and deterioration of the photo cell and like components. The photo-electric sensing means, as utilized in the present apparatus 10, is adapted for reverse operation in comparison with conventional and generally understood installations. That is, transmission of a light beam to the receiver 68 prevents the completion of a circuit to the electric timer 59, the interruption of the light beam by particulate material flow completes the timer circuit and records the time required for completion of the flow.

In automatic operation of the apparatus 10, the selector switch 57 is turned to the automatic A position and the actuator knob 54 is pulled to release the flow control device 43 thereby closing the micro-switch 61 to complete the circuit to the photo-electric sensing means. The light beam emitted by the photo-electric cell 67 extends directly into and across the vertical particulate flow path to the beam receiver 68 and conditions the electric timer 59 for operation. However, actual measurement of the rate of the flow by the electric timer 59 occurs when the gravity flow of particulate material from the hopper 18 through the die cavity 33 intercepts or breaks the light beam. It is therefore understood that the present apparatus is adapted for highly precise flow rate measurement since the electric timer 59 will only record as long as the light beam is interrupted by the actual flow of particulate matter across the light beam. It should again be noted that the micro-switch 61 is held open by the cam 63 until the trap-door arrangment is completely moved through the light beam path to the released or actuated position, and that the circuit is only completed to the photo-electric means when the micro-switch is closed.

In addition to other instrumentation on the control panel 58, a master timer 70 is provided to time particulate flow runs that are too long for the timer 59 and also acts as a double check on the accuracy of the electric timer 59 due to the possibility of misreading the recorded results on the electric timer. The master timer 70 is coupled directly to the electric timer 59 for concurrent recording of particulate flow, and a master timer reset button 72 is provided. Inasmuch as the master timer 70 and the electric timer 59 are directly coupled to provide the same reading, only actual flow time of the material will be recorded in automatic operation even though flow is intermittent or erratic. Accordingly, other timer means (not shown) may be provided for recording the total time period required for all of the particulate material to pass through the die cavity 33. Intermittent or erratic flow can also be recorded by means responsive to the starting or stopping of the timer 59.

A start-stop switch 73 for operation of the vibratory device 40 is mounted on the control panel and a vibration control rheostat means 74 is provided for adjusting the degree of vibration of the receptacle 38. A pilot light 75 is located on the control panel for indicating that the flow meter apparatus 10 is turned on and ready for either manual or automatic operation.

The flow meter apparatus 10 may also include a vacuum dust hood 77 for the hopper 18, the dust hood being selectively connected by a conduit 78 to a vacuum valve device 79 connected to a suitable vacuum source (not shown). Another vacuum conduit 80 is selectively connected to the vacuum valve 79 and is in communication with the particulate measuring and receiving portion 24. The valve is operated to establish a vacuum connection to the hopper 18 during filling thereof with particulate material and vacuum connection is then established to the receiving station 24 prior to actuation of the flow control device thereby minimizing the amount of dust that may be created and obviating the need for excessive cleaning of the apparatus 10.

Referring to FIGURE 1 and to FIGURES 5, 6 and 7, a particulate hopper helper or device may be provided for assisting in the flow of material from the hopper 18 through the die cavity 33 in the event the selected material will not flow by gravity feed. As shown in FIGURE 1, the hopper device 81 has a stem 82 adjustably secured on a suitable mounting member also carrying a vibratory device 83 above the flow meter apparatus 10, and the lower end of the stem extends into the hopper cavity 28 and carries an enlarged head 84 on the free end thereof. The vibratory device 83 may be operated by suitable selective means similar to the switch 73 and vibration control 74 for the vibratory device 40. In fact, the same vibrator switch and control may be used for both vibratory devices 40 and 83 although it is preferred that separate controls be provided. The hopper device head 84 shown in FIGURE 1 is a presently preferred form and has a frusto-conical exterior side wall inverted with respect to the frusto-conical side wall 27 of the hopper. The head 84 also has a hollow or recess 85 formed upwardly from the base line thereof. When the vibratory device 83 is actuated the head 84 acts as a particulate agitator means for maintaining a loosened condition of the material. When the head 84 is stationary in the hopper opening 28 it still acts as a particulate flow regulating or assisting device since it carries the vertical pressures of the material and relieves such pressures from material at the die opening 32. Other forms of particulate regulating means are shown at 86, 87 and 88 in FIGURES 5, 6 and 7, respectively, and it will be noted that the heads thereof may be formed solid, with recesses, or with different conical exterior shapes. It will be understood that the specific forms of the regulating means or the head portions thereof are not to be limited to the specific shapes or constructions disclosed, and other particulate hopper helper means may be provided. The stem 82 is adjustable for varying the depth of projection of the head into the hopper cavity.

Referring now to FIGURES 8–13, it will be seen that a series of orifice containing members, such as simulated die means, is provided for use in the flow meter apparatus. The die 31 of FIGURES 1–4 is illustrated in FIGURE 11 as one of the series, which includes other die means 89–93 of FIGURES 8–10, 12 and 13, respectively. It has been discovered that the length of the straight cylindrical wall portion 33 forming the die cavity is a factor affecting the flow rate of any specific particulate material and, accordingly, each of the die means 89–93 and 31 has a die cavity 33 of equal axial length. It will be clear that the upper end of the frusto-conical openings 32 of the different dies must be the same size as the lower end of the hopper side wall 27 of the hopper opening 28 and must be formed at the same angle with the hopper side wall 27 in order to obviate change of flow rate due to variations in angularity between the side wall 35 of the dies and the side wall 27 of the hopper 18. In other words, the overall vertical dimensions of the different dies (the combined vertical depth of the die cavities 33 and openings 32) must vary depending on the diameter of the die cavities 33 to provide a predetermined angularity of the side wall of the openings 32 conforming to the angularity of the side wall 27 of the hopper opening. Although the partition 19 is disclosed as a vertically adjustable shelf in order to function as a support for the die means 89–93 and 33 and to be adjusted to maintain a firm fit between the die means and the hopper 18 when the hopper is supported in the opening 17 of the top frame 13, it will be understood that the partition may be fixed to the frame 11 and support both the dies and the hopper with the hopper being displaced vertically depending on the depth of the die. In such case, other means may be provided to center and stabilize the hopper 18 in the opening 17. It will also be understood that precision machining of the recess 30 in the base 29 of the hopper 18 and the exterior surfaces of the dies is necessary in order to precisely align the frusto-conical openings 28 and 32 to minimize resistance of particulate material along the side walls 27 and 35.

In studying the rheology of particulate materials it is apparent that many factors may influence flowability or rate and uniformity of flow, and in particular industry pilot equipment simulating actual production facilities could be utilized in the study of these factors. The present apparatus 10 is not intended to supplant pilot equipment nor is its value questioned, but the apparatus 10 is intended for use in the evaluation of many factors influencing flow in order to obviate production problems with a minimum investment in equipment, space and time required for operation. One factor, for instance, is hopper design since it will be clear that the hopper 18 could be the same shape as any production equipment hopper, conduit or the like to thereby simulate actual hopper conditions. In fact, various hoppers may be provided for the present apparatus 10, if desired. However, since hopper shape or design may be a factor in retarding free flow, the present hopper 18 is constructed to provide optimum flow conditions for particulate materials so that specific formulations or granulations may be tested and standards established with which the effect of changes in components, particle size, etc. can be compared.

The hopper 18 has its side wall surface 27 formed at an included angle of 60° (30° from vertical) to minimize the effect of angle of repose while accommodating a sufficiently large volume of material and feeding it to a relatively small outlet. It has been discovered that the perfectly symmetrical cone or funnel is not the best shape for a hopper and that, in lieu of a hopper helper 84 or the like, flow may be facilitated by the use of a vertical partition 95 (shown in broken lines in FIGURES 1 and 3) which in section (FIGURE 3) forms a chord across the hopper side wall 27 at one side of the die opening 32. The partition or hopper divider 95 has a lower end 96 spaced above the die opening 32. Particulate material is only placed in the hopper 18 on the side of the partition 95 directly accessible to the die cavity 33. The levels 20 on the horizontal partition 19 are important in maintaining the hopper 18 in the proper straight position so that the angle of the side wall surface 27 will be uniform with respect to vertical. The partition 19 must be strong enough to support the hopper 18 without being distorted, or the hopper levels 20 may be mounted directly on the hopper 18.

Another factor to be considered in the present apparatus 10 is the length of the die cavity 33. The depth (axial length) of the cavities 33 of each of the dies 89–93 and 31 is about 11/16 inch which has been determined to be about the optimum dimension for pharmaceutical granulations used in certain tableting equipment. Of course, in other industries the optimum die cavity length or orifice depth may be different. The diameter of the die cavities 33 of the set of dies 89–93 and 31 are in the range of 1/4 to 1 1/4 inches, and it will be clear that the orifice diameters for exchangeable die means should range on both sides of the expected production requirements for the feeding means for the particulate material in any industry.

Another factor is distance of free gravity fall, which is the proximity of the outlet end of the die cavity 33 to the receiver 38. In any finished granulation from which a pharmaceutical product is to be formed the size of particles vary from fines to relatively course particles in a range dependent upon the screening technique used. All equipment used in handling granulation vibrate and naturally there is a tendency for the granulation to separate according to particle size with the fines forming a layer on the bottom. This particle separation is called "unmixing" or "classification" in the trade. If a perfect granulation were possible there would be a free and uniform flow of granulation with no unmixing, but so-called "perfect" granulation seldom occurs in actual practice. In the present apparatus 10, the vibratory means 40 simulates machine vibration and acts on the receiver 38 to indicate the degree of unmixing occurring. Also, granule separation will occur to some extent during the free gravity fall of the particulate material from the die cavity 33 to the receiver 38, and the distance of the vertical flow path is preferably in the range of 6 to 10 inches thereby holding the free fall to a relatively short distance. Visual observation of particulate material in the receiver 38 will indicate the extent of classification by particle size, and even though free and uniform gravity flow of the material is recorded, excessive unmixing or classification may provide the basis for rejecting the granulation as unsatisfactory for production.

The flow control device 43 is illustrated as a trap-door arrangement that swings away from the die cavity outlet to establish gravity flow of the granulated material from the hopper 18. The measuring method described hereinafter is particularly advantageous since the cavity closure device 43 does not have to be closed to terminate the measurement, and it will be apparent that other forms of control device 43, such as a sliding gate, pivotal knife device or the like, may be used.

It will be understood that flow metering apparatus 10 according to the present invention is designed to measure flow rate in weight per time rather than the more conventional volume per time basis usually employed in flow measurement. Although volume could be a unit for measurement in some industries, most granulated materials are subject to variation in density (weight) so that volume is the least dependable factor. Density-weight is an important factor in tableting and like pharmaceutical production where compression and related "fill" and "form" factors are also critical in establishing accurate dosage.

In establishing laboratory test procedures for the flow meter device 10, the two possible methods of determining relative flowability are to determine the time of flow of a predetermined amount of granulated material (by weight) or to determine the weight of granulated material flowing in a predetermined time period. The latter procedure is not preferred since several problems arise, including effecting closure of the die cavity against the flow of material without scattering or diverting material out of the flow path and without comminuting some particles. Scattering of material requires extensive cleaning and comminution of particles produces fines or changes the shape of particles. Furthermore, measurement of flow rate based on a fixed time unit is not as accurate, and the weight of material measured must still be determined.

The presently preferred laboratory procedure, therefore, is to provide a predetermined amount, by weight, of granulated material and place it in the hopper 18, release the closure device 43 and measure the length of time of particle flow. The recorded rate is then compared with docimastical standards pre-established for the granulation from which evaluation may be made as to flowability. Each standard is created by averaging a series of runs or tests with a known formulation, and several standards should be established for variations in the same basic formulation whereby flow rate determination of production granulations of the formulation will establish its acceptability.

It will be apparent from the foregoing that the present apparatus 10 and test procedures therefor may be used in the quality control of production materials as well as in measuring or testing unknown granulated materials as to flowability and classification.

This invention is intended to cover all changes and modifications of the present disclosure which will be readily apparent to all skilled in the art, and the invention is only to be limited by the scope of the claims which follow.

What we claim is:

1. An apparatus for measurement of the flowability of particulate materials, comprising hopper means for containing particulate material, separate orifice means positioned below said hopper means to receive particulate material therefrom, said hopper and orifice means having contiguous side walls, means normally closing said orifice means to prevent the flow of particulate material therethrough and being movable to a retracted position for permitting a stream of particulate material to flow from said hopper means through said orifice means, particulate flow assisting means positioned in said hopper means for relieving pressures and assisting particulate flow therefrom, selectively operable vibrator means acting on said flow assisting means for agitating the particulate material in said hopper means, and other means solely responsive to the flow of particulate material through said orifice means for effecting measurement of the relative flowability thereof.

2. An apparatus for measurement of the flowability of particulate material, comprising hopper means for containing particulate material, separate orifice means positioned below said hopper means to receive particulate material therefrom, said hopper and orifice means having contiguous side walls, means normally closing said orifice means to prevent the flow of particulate material therethrough and being movable to a retracted position for permitting a stream of particulate material to flow from said hopper means through said orifice means, other means solely responsive to the flow of particulate material through said orifice means for effecting measurement of the relative flowability thereof, receiver means positioned below said orifice means to receive particulate material therefrom, and means for simulating production equipment vibration to determine granule classification thereby.

3. An apparatus for comparative measurement of the flowability of particulate materials, comprising a main frame having a vertical particulate flow area, hopper means superposed above said flow area and having a frusto-conical side wall for containing particulate material to be measured, die simulating means below said hopper means and having a frusto-conical opening forming an uninterrupted continuation of said hopper means and having a die cavity of predetermined size, said die cavity having a lower outlet end defining the top of said flow area, closure means normally closing said lower outlet end to prevent particulate material flow from said hopper means and being actuated to a remote position for providing gravity flow of said particulate material in a stream through said die cavity outlet means into said flow area, an eccentrically operated signalling device constructed and arranged with respect to said flow area for transmitting a sensing beam across the flow path of particulate material spaced below said lower outlet end of said die cavity, said signalling device being conditioned for operation when said closure means is actuated to said remote position and being responsive solely to the flow of particulate material interrupting said sensing beam in said flow area, and automatic recording means controlled by said signalling device for effecting measurement of the relative flowability of said particulate material during the interruption of said sensing beam by the flow of particulate material.

4. An apparatus for comparative measurement of the flowability of particulate materials, comprising a main frame having a vertical particulate flow area, hopper means superposed above said flow area and having a frusto-conical side wall for containing particulate material to be measured, die simulating means below said hopper means and having a frusto-conical opening forming an uninterrupted continuation of said hopper means and having a die cavity of predetermined size, a vertical partition extending chordwise across said frusto-conical hopper side wall to provide a non-symmetrical hopper opening for receiving particulate material on only one side of said vertical partition and facilitating particulate flow from said hopper means into said die cavity, said cavity having a lower outlet end defining the top of said flow area, closure means normally closing said lower outlet end to prevent particulate material flow from said hopper means and being actuated to a remote position for providing gravity flow of said particulate material in a stream through said die cavity outlet means into said flow area, sensing means constructed and arranged with respect to said flow area to be responsive to the flow of particulate material when said closure means is actuated to said remote position, and automatic recording means controlled by said sensing means for effecting measurement of the relative flowability of said particulate material.

5. An apparatus for comparative measurement of the flowability of particulate materials, comprising a main frame having a vertical particulate flow area, hopper means superposed above said flow area and having an opening for containing particulate material to be measured, particulate metering means below said hopper means and having an entrance opening forming an uninterrupted continuation of said hopper means and having an orifice of predetermined size, the side walls defining said hopper means opening and metering means orifice being substantially obstruction free, said orifice having an outlet defining the top of said flow area, orifice closure means normally closing said orifice outlet and being movable to a remote position from said orifice outlet to permit particulate flow, said closure means having cam means thereon, photoelectric means constructed and arranged with respect to said orifice outlet and flow area to be responsive to the flow of particulate material and including disabling means controlled by said cam means of said closure means to render said photo-electric means normally inoperable and establish photo-current conduction of said photo-electric means in the remote position of said closure means, and recording means responsive to photo-current interruption by the flow of particulate material for measuring the flowability of said particulate material.

6. The apparatus according to claim 5 in which said closure means is hingedly connected to swing through the path of said photo-electric means, and said disabling means comprises a switch controlled by said cam means carried by said closure means and said switch being maintained open during closure means movement to said remote position.

7. The apparatus according to claim 3 in which said die simulating means comprises one of a set of exchangeable orifice means having die cavities of predetermined equal length and each having a uniform cross-section throughout such length.

References Cited

UNITED STATES PATENTS

| | | | |
|---|---|---|---|
| 377,843 | 2/1888 | Wolfe | 73—223 |
| 546,604 | 7/1895 | Carpenter | 73—56 |
| 952,145 | 3/1910 | Schilling | 141—74 |
| 1,553,802 | 9/1925 | Claypoole | 73—56 |
| 1,639,057 | 8/1927 | Peabody | 73—56 |
| 2,174,348 | 9/1939 | Damond | 222—196 |
| 2,238,758 | 4/1941 | Thornhill. | |
| 2,381,505 | 8/1945 | Lindholm | 250—218 X |
| 2,668,441 | 2/1954 | Peterson | 73—56 |
| 3,000,207 | 9/1961 | Goffe | 73—113 |
| 3,187,563 | 6/1965 | Tobias | 73—56 |
| 2,538,413 | 1/1951 | Chard | 22—70 |
| 3,124,278 | 3/1964 | Cox | 222—196 |
| 3,221,560 | 12/1965 | Kosa et al. | 73—432 |
| 3,234,784 | 2/1966 | Wiegmann | 73—223 X |
| 3,241,581 | 3/1966 | Richardson et al. | 141—93 |
| 2,668,441 | 2/1954 | Peterson | 73—56 |
| 3,000,207 | 9/1961 | Goffe | 73—113 |

FOREIGN PATENTS 492,560  3/1919  France.

RICHARD C. QUEISSER, Primary Examiner.

JAMES GILL, Examiner.

E. D. GILHOOLY, Assistant Examiner.

UNITED STATES PATENT OFFICE
CERTIFICATE OF CORRECTION

Patent No. 3,376,753                                             April 9, 1968

Courtney G. Pitkin et al.

It is certified that error appears in the above identified patent and that said Letters Patent are hereby corrected as shown below:

Column 1, line 56, "device" should read -- devices --. Column 2, line 51, "material" should read -- materials --. Column 4, line 23, "devices" should read -- device --. Column 5, line 41, "the", third occurrence, should read -- and --. Column 10, line 2, "eccentrically" should read -- electrically --; line 63, before "establish" insert -- to --.

Signed and sealed this 5th day of August 1969.

(SEAL)
Attest:

Edward M. Fletcher, Jr.                              WILLIAM E. SCHUYLER, JR.
Attesting Officer                                                 Commissioner of Patents